United States Patent [19]
Okuda et al.

[11] Patent Number: 5,477,386
[45] Date of Patent: Dec. 19, 1995

[54] OPTICAL SYSTEM FOR OPTICAL DISC APPARATUS INCLUDING ANAMORPHIC PRISMS

[75] Inventors: Isao Okuda; Suguru Takishima; Masahiro Oono; Koichi Maruyama; Masato Noguchi, all of Tokyo, Japan

[73] Assignee: Asahi Kogaku Kogyo Kabushiki Kaisha, Tokyo, Japan

[21] Appl. No.: 917,324

[22] Filed: Jul. 23, 1992

[30] Foreign Application Priority Data

Jul. 24, 1991 [JP] Japan ................................. 3-086162 U
Jul. 24, 1991 [JP] Japan ..................................... 3-274426

[51] Int. Cl.$^6$ ............................. G02B 7/18; G02B 13/10; G02B 27/10; G11B 7/12
[52] U.S. Cl. ........................... 359/669; 359/638; 359/831; 359/833; 369/112
[58] Field of Search ..................................... 359/638, 668, 359/669, 670, 671, 831, 833, 669; 369/44.23, 112

[56] References Cited

U.S. PATENT DOCUMENTS

| | | | |
|---|---|---|---|
| 4,333,173 | 6/1982 | Yonezawa et al. | 369/45 |
| 4,750,819 | 6/1988 | Sugiki | 359/669 |
| 4,770,507 | 9/1988 | Arimoto et al. | 359/669 |
| 4,828,371 | 5/1989 | McCaslin et al. | 359/669 |
| 4,850,686 | 7/1989 | Morimoto et al. | 359/196 |
| 4,948,233 | 8/1990 | Maruyama | 359/669 |
| 5,013,136 | 5/1991 | Whitehead et al. | 359/834 |
| 5,016,237 | 5/1991 | Nakamura et al. | 359/669 X |
| 5,023,858 | 6/1991 | Nakayama | 369/112 |
| 5,144,617 | 9/1992 | Gotoh et al. | 369/112 X |
| 5,220,553 | 6/1993 | Ando et al. | 359/837 X |
| 5,223,970 | 6/1993 | Oono et al. | 359/223 |

FOREIGN PATENT DOCUMENTS

| | | |
|---|---|---|
| 59-229753 | 12/1984 | Japan. |
| 60-234247 | 11/1985 | Japan. |
| 3-93048 | 4/1991 | Japan ................................. 369/44.23 |

*Primary Examiner*—William L. Sikes
*Assistant Examiner*—David R. Parsons
*Attorney, Agent, or Firm*—Sandler, Greenblum & Bernstein

[57] ABSTRACT

An optical system of an optical disc apparatus is disclosed for converging and projecting a bundle of rays emitted from a light source onto an optical disc. The optical system includes a collimating lens which collimates the bundle of rays emitted from the light source, two anamorphic prisms for shaping the cross section of the collimated bundle of rays transmitted through the collimating lens, and an objective lens which converges the bundle of rays shaped by the anamorphic prisms onto the optical disc. At least one of the anamorphic prisms is detachably mounted to an immovable body portion of the optical system.

21 Claims, 6 Drawing Sheets

OPTICAL SYSTEM FOR OPTICAL DISC APPARATUS INCLUDING ANAMORPHIC PRISMS

BACKGROUND OF THE INVENTION

1. Field of the Invention

The present invention relates to an improved optical system for converging divergent rays of light emitted from a light source onto an optical disc to optically record data and for reading (reproducing) the optical data recorded on the optical disc.

2. Description of Related Art

In a known optical disc apparatus, a semiconductor laser which emits coherent light is usually used as a light source. The bundle of rays emitted from the semiconductor laser is divergent light having an elliptical shape in cross section. The divergent light is collimated by a collimating lens and is converged onto the optical disc through an objective lens.

Both the beam that is converged onto tile optical disc to record data on the optical disc, and the beam that is converged onto the optical disc to erase recorded data from the optical disc, must have high energy. It is therefore necessary to effectively utilize the amount of light emitted from the semiconductor laser. To increase the light utilization efficiency, a collimating lens having a large numerical aperture (short focal length) is used. However, the width of the bundle of rays on the minor diameter side, transmitted through such a collimating lens having a large numerical aperture, is smaller than the aperture of the objective lens, making it impossible to effectively converge all rays onto the optical disc. To solve this problem, usually one or two anamorphic prisms are employed to change the ellipticity of the collimated rays to thereby increase the width of the light beam on the minor diameter side. As a result, the adjusted beam meets (i.e., is equal to) the aperture of the objective lens to obtain a desired beam spot at a predetermined pit (position) on the optical disc. If the divergence angle of the beam emitted from the semiconductor laser is extremely small, it is very difficult to satisfy the requirements of the aperture of the objective lens, whereas if the divergence angle is extremely large, the light utilization efficiency is decreased. Under these circumstances, the semiconductor laser to be used is determined in accordance with the divergence angle thereof.

The anamorphic prism functions to shape the elliptical laser beam into a substantially circular beam. If two anamorphic prisms are used, they are usually made of the same glass.

However, in view of irregularities in the divergence angle between the products (semiconductor lasers) which might possibly occur as a result of manufacturing errors, etc., it is nearly impossible to obtain a desired beam spot quality in all such lasers. Therefore, it is likely that some lasers will have poor quality (e.g., decreased precision) in the recording and reproduction of data or signals.

Furthermore, the oscillation wavelength of the semiconductor laser slightly fluctuates depending on the output thereof, ambient temperature, etc. Accordingly, if there is a change in the oscillation wavelength of the semiconductor laser in the conventional optical disc apparatus, the divergence angle of the beam emitted from the anamorphic prism(s) changes, so that the beam spot is deviated from a predetermined pit of the optical disc, resulting in a decreased precision of recorded and reproduced signals.

SUMMARY OF THE INVENTION

The primary object of the present invention is to provide an optical system in an optical recording/reproducing apparatus, in which the angular magnification of the anamorphic prism is selected in response to the divergence angle of the semiconductor laser to obtain a desired beam spot at a predetermined pit of the optical recording medium.

Another object of the present invention is to provide an optical system in an optical recording/reproducing apparatus, in which even if there is a change in the oscillation wavelength of ! the semiconductor laser, little or no deviation of the beam spot to be converged onto the optical recording medium from a desired pit of the optical recording medium occurs.

According to the present invention, there is provided an optical system of an optical recording/reproducing apparatus for converging and projecting a bundle of rays emitted from a light source onto an optical disc. The system includes a collimating lens which collimates the bundle of rays emitted from the light source, an anamorphic prism for shaping the cross section-of the collimated bundle of rays transmitted through the collimating lens, and an objective lens which converges the bundle of rays shaped by the anamorphic prism onto the optical recording medium. Furthermore, in the above arrangement, the anamorphic prism is detachably mounted to an immovable body portion of the optical system.

With this arrangement, since the anamorphic prism can be easily selected in accordance with the sectional shape (i.e., circular) of the emitted beam, a beam of substantially ideal shape can be projected onto an optical disc of an optical system.

According to another aspect of the present invention, there is provided an optical system of an optical recording apparatus for converging and projecting a bundle of rays emitted from a light source onto an optical disc, including a collimating lens which collimates the bundle of rays emitted from the light source, first and second anamorphic prisms which are made of different materials and which shape the cross section of the collimated bundle of rays transmitted through the collimating lens, and an objective lens which converges the bundle of rays shaped by the anamorphic prisms onto the optical recording medium.

With this arrangement, adverse effects caused by a change in the wavelength of the beam emitted from the semiconductor laser can be minimized.

Preferably, the refractive indexes $n_1$ and $n_2$ of the first and second anamorphic prisms, the apex angle $P_1$ of the first anamorphic prism, the angle $\theta_6$ of refraction of the second anamorphic prism at an incident surface thereof, variations $\Delta n_1$ and $\Delta n_2$ of the refractive indexes of the first and second anamorphic prisms corresponding to a change in wavelength, and the angular magnification $\gamma$ of the second anamorphic prism satisfy the following relationship;

$$0.8 \leq (\Delta n_1 \cdot P_1/n_1)/(\Delta n_1 \cdot \theta_6 \cdot \gamma/n_2) \leq 1.25$$

In this embodiment, even if the wavelength fluctuates, little or no change of the divergence angle of the bundle of rays emitted from the second anamorphic prism occurs. Accordingly, a beam spot can be precisely converged onto a predetermined pit of the optical recording medium.

The present disclosure relates to subject matter contained in Japanese patent application No. 03-274426 (filed on Jul. 24, 1991) and Japanese utility model application No. 03-86162 (filed on Jul. 24, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 3:
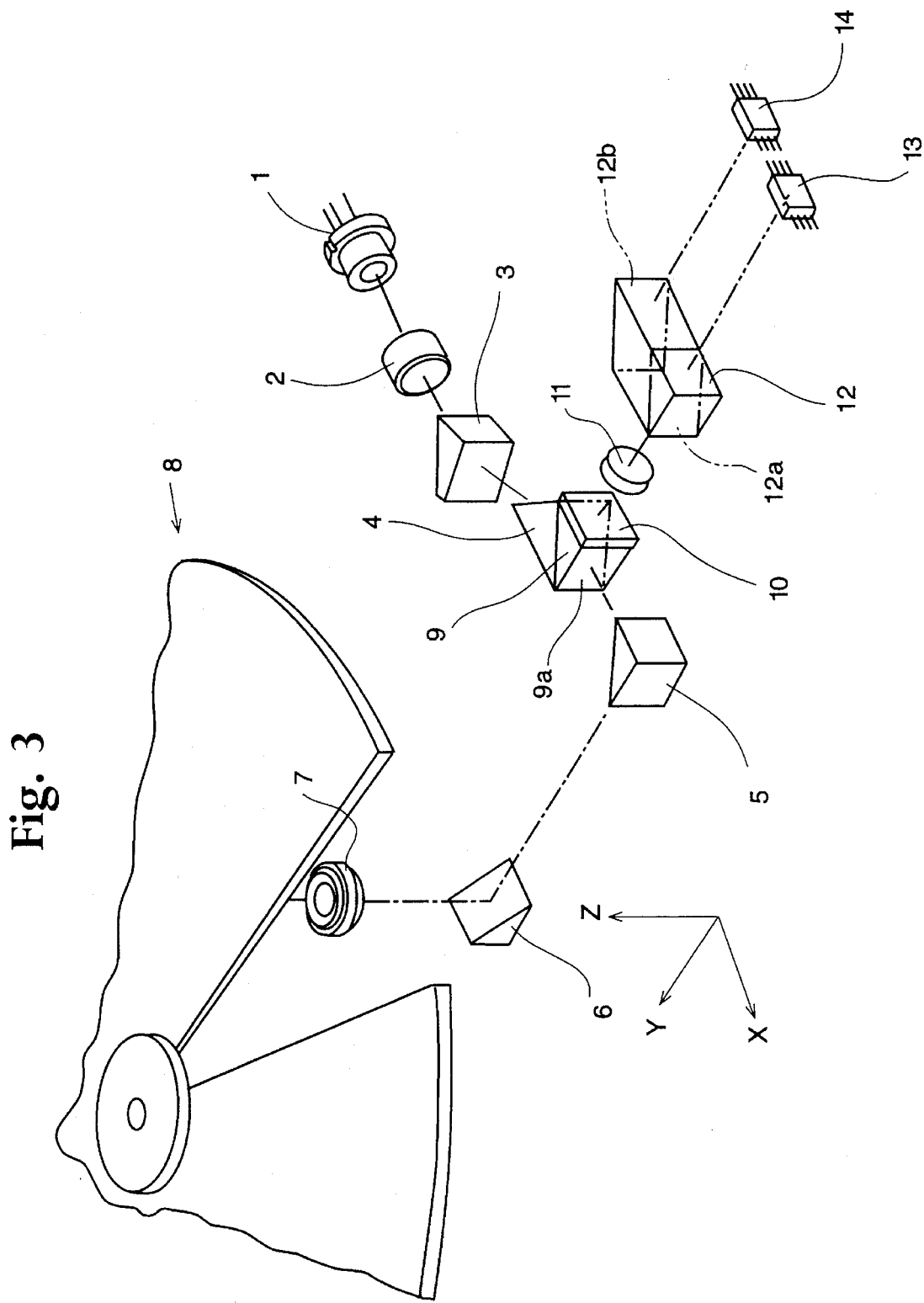
FIG. 3 is an explanatory schematic view of an entire optical system of an optical disc apparatus according to the present invention.

FIG. 3 shows an optical arrangement of an entire optical disc apparatus according to the present invention. In FIG. 3, a semiconductor laser 1 emits a divergent bundle of rays which is collimated by a collimating lens 2. The beam collimated by collimating lens 2 has an elliptically shaped cross section which is shaped into a circular beam by first and second anamorphic prisms 3 and 4. The collimated circular bundle of rays is then converged onto an optical disc 8 through a routine (i.e., ordinary) prism 5, a raising routine prism 6, and an objective lens 7. The objective lens 7 and the raising routine prism 6 are located in a head (not shown) which is slidable in the radial direction (tracking direction) of the optical disc 8. The objective lens 7 is moved in the optical axis direction (focus adjusting direction) by an actuator (not shown), also provided in the head.

The second anamorphic prism 4 has a reflecting surface on which a half mirror prism 9 is attached. The half mirror prism 9 has a λ/2 plate 10 attached thereto.

The bundle of rays reflected by the optical disc 8 is returned along the optical path through objective lens 7, routine prism 6, and routine prism 5 and is then partly reflected by the reflecting surface 9a of the half mirror prism 9 and is then made incident upon the λ/2 plate 10 in which the polarizing direction is turned by 45°. The light transmitted through the λ/2 plate 10 is made incident upon a polarizing beam splitter 12 through a condenser lens 11. The P-polarized light component transmitted through the polarizing beam splitter 12 is transmitted through a polarizing separation surface 12a and is converged onto a first light receiving element 13 where a first recording signal is detected. The S-polarized light component incident on the polarizing beam splitter 12 is reflected by the polarizing separation surface 12a and a total reflection surface 12b thereof before being converged onto a second light receiving element 14 where a second recording signal is detected.

The first and second anamorphic prisms 3 and 4 contained in the optical system shown in FIG. 3 cooperate to shape the collimated rays from the collimating lens 2, as mentioned above. The first and second anamorphic prisms 3 and 4 are made of different glass materials exhibiting different lateral magnifications.

Figure 1:
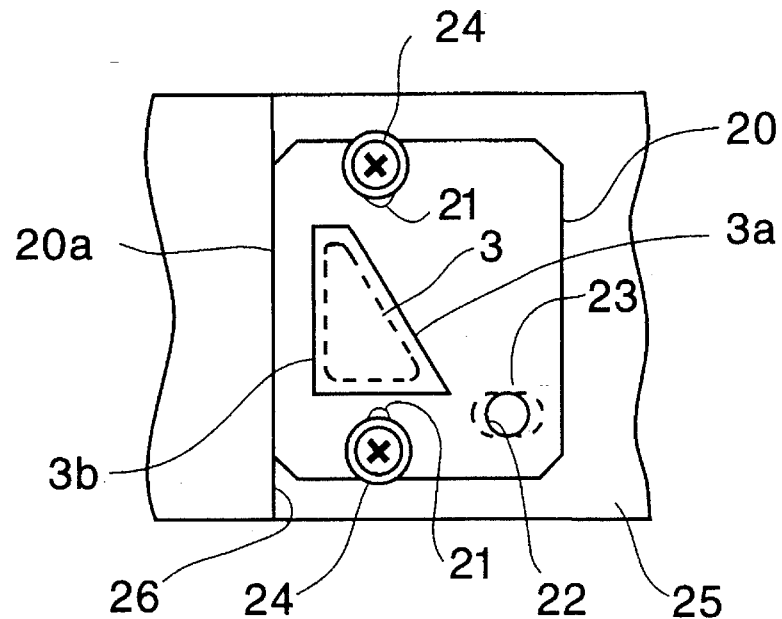
FIG. 1 is a plan view of a first anamorphic prism which constitutes an optical system of an optical disc apparatus according to the present invention.
Figure 2:
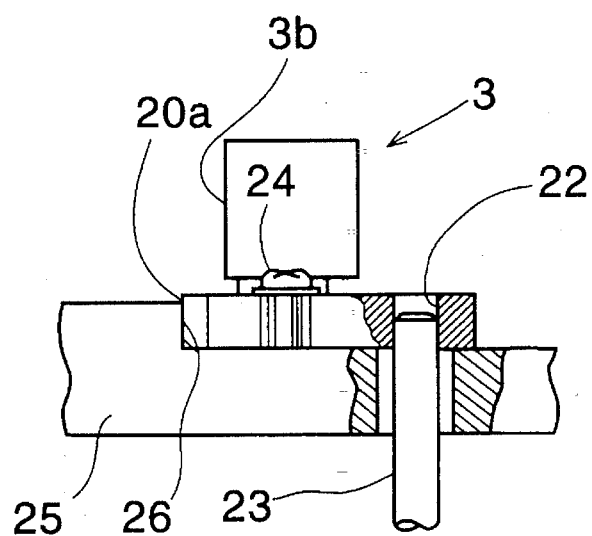
FIG. 2 is a side elevation view of a first anamorphic prism shown in FIG. 1.

The first anamorphic prism 3 is secured to an anamorphic prism substrate 20, as shown in FIGS. 1 and 2. The substrate 20 has a pair of guide grooves 21 and a positioning hole 22. The substrate 20 is positioned by a positioning pin 23 fitted in the positioning hole 22 and is mounted to a mounting base 25 which is secured to an immovable body of the apparatus by a pair of machine screws 24 inserted in the respective guide grooves 21. The mounting base 25 is provided with an adjusting upright guide surface 26 which can be brought into surface contact with an upright wall surface 20a defined by one of the end walls of the substrate 20. The adjusting upright guide surface 26 is substantially normal to the optical axis between the anamorphic prisms 3 and 4.

In the embodiment illustrated in FIG. 1, the outgoing surface 3b of the first anamorphic prism 3 is parallel with the adjusting guide surface 26 of the substrate 25. Preferably, different kinds of anamorphic prism units are prepared in which the outgoing surfaces 3b of the first anamorphic prisms 3 define different angles with respect to the adjusting guide surfaces 26 of the substrates 25, so as to provide various anamorphic prisms having different angular magnifications.

Figure 4:
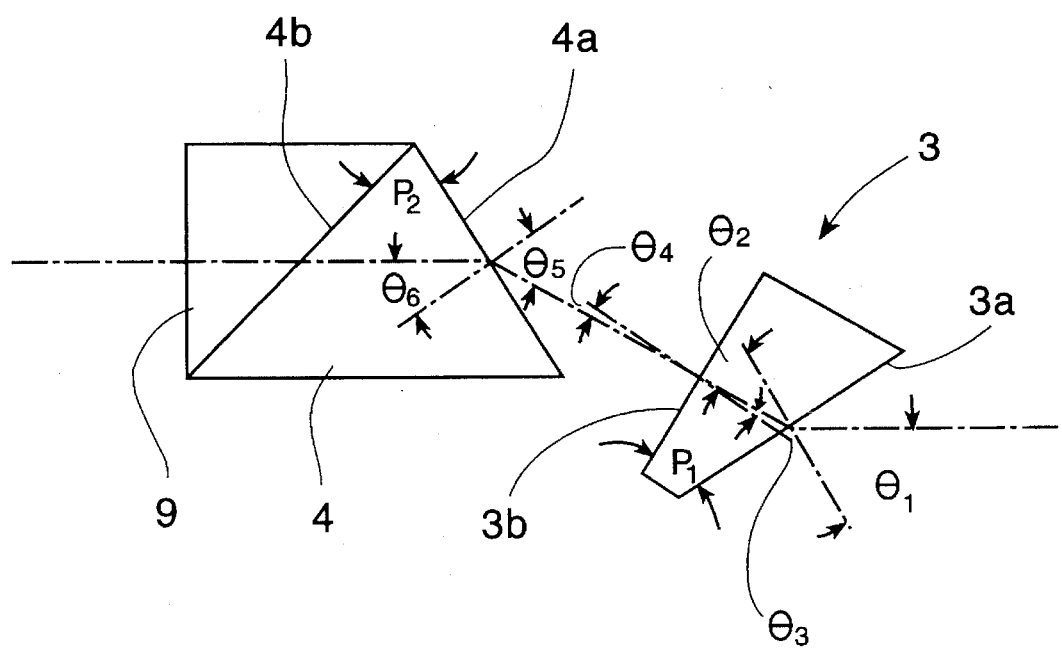
FIG. 4 is a schematic view of an arrangement of a prism system in an optical disc apparatus according to the present invention.

In FIG. 4, "$P_1$" designates the apex angle of the first anamorphic prism, "$P_2$" the apex angle of the second anamorphic prism, "$\theta_1$" the incident angle of light upon the incident surface 3a of the first anamorphic prism 3, "$\theta_2$" the angle of refraction at the incident surface 3a of the first anamorphic prism 3, "$\theta_3$" the incident angle of light upon the outgoing surface 3b of the first anamorphic prism 3, "$\theta_4$" the angle of refraction at the outgoing surface 3b of the first anamorphic prism 3, "$\theta_5$" the incident angle of light upon the incident surface 4a of the second anamorphic prism 4, and "$\theta_6$" the angle of refraction at the incident surface 4a of the second anamorphic prism.

Tables 1 and 2 below show examples of the first and second anamorphic prisms 3 and 4 in combination, wherein the oscillation wavelength of the semiconductor laser is 780 nm ($\lambda$=780 nm) and "$\gamma$" designates the angular magnification of the anamorphic prisms. The glass materials of which the anamorphic prisms 3 and 4 are made are represented by trade names. The angles are in units of degrees. The anamorphic prisms 3 and 4 are arranged to vary the magnification in the same direction (lateral direction in the illustrated embodiment).

TABLE 1

| first anamorphic prism | $P_1$ | $\gamma$ | total magnification |
|---|---|---|---|
| glass material SF5 | 29.52 | 1.51 | 2.51 |
| second anamorphic prism | $P_2$ | $\gamma$ | |
| glass material BK7 wherein $P_1 = \theta_2$ $P_2 = \theta_6 + 45 = 35.18 + 45$ | 80.18 | 1.66 | |

TABLE 2

| first anamorphic prism | $P_1$ | $\theta_1$ | $\gamma$ | total magnification |
|---|---|---|---|---|
| glass material SF5 | 25.04 | 62.50 | 1.80 | 2.99 |
| second anamorphic prism | $P_2$ | $\theta_5$ | $\gamma$ | |
| glass material BK7 wherein $P_1 = \theta_2 - \theta_3 = 32.31 - 7.27$ | 80.18 | 60.50 | 1.66 | |

TABLE 2-continued $$P_2 = \theta_6 + 45 = 35.18 + 45$$

The characteristics of the glass materials SF2, SF5, F16 and BK7 are shown below.

|     | $n_d$   | $v_d$ |
|-----|---------|-------|
| SF2 | 1.64769 | 33.8  |
| SF5 | 1.67270 | 32.1  |
| F16 | 1.59270 | 35.3  |
| BK7 | 1.51633 | 64.1  |

$n_d$ and $v_d$ designate the refractive index and the Abbe number to the d-ray of sodium, respectively.

As can be seen from the above discussion, the use of anamorphic prisms having different angular magnifications depending on the light divergent angles of the semiconductor laser makes it possible to adjust the magnification of the entire optical system of the shaping prisms. It is therefore possible to obtain a desired shape of beam spot on an optical disk by selecting anamorphic prisms having optimum angular magnification.

In the illustrated embodiment, although the first anamorphic prisms are selectively and detachably mounted to the body of the apparatus so as to have different angles of outgoing surfaces, it is possible to prepare and selectively mount the second anamorphic prisms to the body of the apparatus so as to have different angles of outgoing surfaces.

As can be understood from the above, discussion, according to the first embodiment, a desired beam spot can be formed on the optical disc by selecting a first or second anamorphic prism having an optimum angular magnification corresponding to the divergent angle of the semiconductor laser.

FIGS. 5 through 8 show modified embodiments of the present invention in which, if the oscillation wavelength of the semiconductor laser changes, no displacement or deviation of the beam spot, which is to be converged onto the optical disc, will occur.

Figure 5:
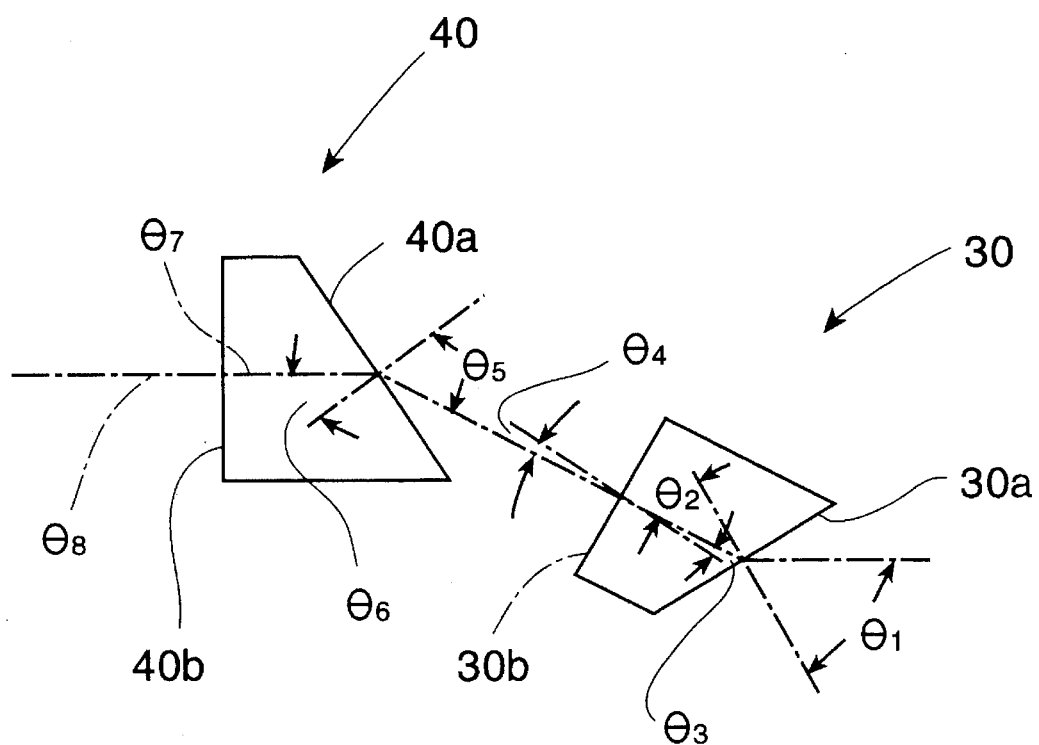
FIG. 5 is a view similar to FIG. 4, according to another embodiment of the present invention.

Looking at FIG. 5, which shows a prism optical system including first and second anamorphic prisms 30 and 40 made of glass materials having refractive indexes of $n_1$ and $n_2$, respectively, the arrangement of the components in the illustration is necessary for shaping the collimated bundle of rays, while correcting the dispersion at different outgoing angles depending on the wavelength of the incident light. The arrangement can be modified when applied to an optical system of an optical disc apparatus, as will be discussed hereinafter.

It is assumed in FIG. 5 that "$\theta_1$" designates the incident angle of the collimated bundle of rays incident on the incident surface 30a of the first anamorphic prism 30 from a medium (e.g., air) of refractive index $n_0$., "$\theta_2$" the angle of refraction at the incident surface 30a of the first anamorphic prism 30, "$\theta_3$" the incident angle on the outgoing surface 30b of the first anamorphic prism 30, and "$\theta_4$" the angle of refraction at the outgoing surface 30b of the first anamorphic prism 30. Further, it is assumed that "$\theta_5$" designates the incident angle of the collimated bundle of rays incident on the incident surface 40a of the second anamorphic prism 40, "$\theta_6$" the angle of refraction at the incident surface 40a of the second anamorphic prism 40, "$\theta_7$" the incident angle on the outgoing surface 40b of the second anamorphic prism 40, and "$\theta_8$" the angle of refraction at the outgoing surface 40b of the second anamorphic prism 40.

Since the refractive index of an anamorphic prism varies depending on the wavelength of light transmitted therethrough, the above-mentioned angles $\theta_2$ through $\theta_8$ vary in accordance with the wavelength of light transmitted through the prism system shown in FIG. 5.

As will be discussed below, an objective lens is provided on or behind the outgoing surface 40b of the second anamorphic prism 40 opposite the recording surface of the optical disc. Consequently, light transmitted through the prism system is converged as a beam spot onto the optical disc by the objective lens 7. The beam converging point at which the beam spot is formed is changed if the angle $\theta_8$ is changed due to a change in wavelength of the light.

The variation (deviation) S of the beam converging point is given by:

$$S = f \cdot \tan \Delta\theta_8$$

wherein "f" designates the focal length of the objective lens, and "$\Delta\theta_8$" the variation of angle $\theta_8$ of refraction corresponding to the change in the wavelength of light.

Table 3 below gives concrete examples; of the anamorphic prisms 30 and 40 in combination, provided in the optical arrangement mentioned above.

In the combination, it is assumed that the variable range of the light source (i.e., semiconductor laser) is $\lambda=780$ nm~790 nm, and the total magnification of the first and second anamorphic prisms 30 and 40 is 2.746.

In Table 3, the glass materials of the first and second anamorphic prisms are identified by their trade names, and the angles are in units of degrees.

Furthermore, "$\gamma$" designates the angular magnifications (anamorphic magnification) of the first and second anamorphic prisms and can be obtained by the following equation.

$$\begin{aligned}
\gamma &= \cos\phi_2/\cos\phi_1 \\
&= \cos\phi_2/(1 - \sin^2\phi_1)^{1/2} \\
&= \cos\phi_2/[1 - \{(\beta/\alpha)\sin\phi_2\}^2]^{1/2}
\end{aligned}$$

wherein "$\phi_1$" designates the angle of light incident on the surface of the anamorphic prism having a refractive index $\beta$ from a medium having a refractive index $\alpha(=1$, in case of air), and "$\phi_2$" designates the angle of refraction at the incident surface, respectively.

"$\gamma$" designates the angular magnification of the anamorphic prisms.

TABLE 3

| when $\lambda = 780$ nm: | | | |
|---|---|---|---|
| $\theta_1$ | $\theta_2$ | $\theta_3$ | $\theta_4$ |
| 58.930000000 | 31.074421100 | 3.790000000 | 6.297479873 |
| $\theta_5$ | $\theta_6$ | $\theta_7$ | $\theta_8$ |
| 60.526099100 | 35.188446100 | 0.000000000 | 0.000000000 |
| when $\lambda = 790$ nm: | | | |
| $\theta_1$ | $\theta_2$ | $\theta_3$ | $\theta_4$ |
| 58.930000000 | 31.083539300 | 3.799118270 | 6.310996767 |
| $\theta_5$ | $\theta_6$ | $\theta_7$ | $\theta_8$ |
| 60.512582200 | 35.188553900 | 0.000107800 | 0.000162826 |

| glass material | first anamorphic prism SF5 | second anamorphic prism BK7 |
|---|---|---|
| N ($\lambda = 780$ nm) | 1.65947060 | 1.51072180 |

TABLE 3-continued

| | | |
|---|---|---|
| N ($\lambda$ = 790 nm) | 1.65903250 | 1.51051630 |
| $\gamma$ ($\lambda$ = 780 nm) | 1.65320705 | 1.66100852 |
| $\gamma$ ($\lambda$ = 790 nm) | 1.65302285 | 1.66031331 |
| S = 0.0107990419 (μm) | | | wherein N designates the refractive index, and f (focal length of the objective lens)=3.8 (mm).

As can be seen from the above discussion, if the wavelength of the semiconductor laser is changed, there is no change in the emission angle of the second anamorphic prism, so that the deviation of the beam converging point from a predetermined pit of the optical disc is restricted.

In FIG. 4, in which the first anamorphic prism 3 having the refractive index $n_1$ and the second anamorphic prism 4 having the refractive index $n_2$ are arranged, preferably the apex angle $P_1$ of the first anamorphic prism 3 and the angle $\theta_6$ of refraction of the second anamorphic prism 4 at the incident surface thereof satisfy the following relationship;

$$0.8 \leq (n_1-1) \cdot P_1 / (n_1-1) \cdot \theta_6 \leq 1.25 \quad (a)$$

This requirement ensures that the optical axis of the incident light is substantially parallel with the optical axis of the outgoing light and provides for an easy assembly of the components.

The chromatic aberration of each anamorphic prism is substantially proportional to $\Delta n_i \cdot P_i / n_i$ (i=1, 2), wherein $\Delta n_1$ and $\Delta n_2$ represent the variation in index of refraction of the first and second anamorphic prisms corresponding to the variation in wavelength of the semiconductor laser, respectively. If the first and second anamorphic prisms are arranged in such a way that the chromatic aberrations of the anamorphic prisms tend to be cancelled, the chromatic aberration by the first anamorphic prism is compressed by $1/\lambda$ (here, $\lambda$ is the angular magnification of the second anamorphic prism) by the second anamorphic prism. Consequently, if the chromatic aberration of the first anamorphic prism 3 is $\lambda$ times the chromatic aberration of the second anamorphic prism 4, theoretically, there will be no chromatic aberration resulting in the optical system as a whole. From this analysis, the following requirement is derived;

$$0.8 \leq (\Delta n_1 \cdot P_1 / n_1) / (\Delta n_2 \cdot \theta_6 \cdot \gamma / n_2) \leq 1.25$$

Tables 4 through 7 show concrete numerical examples which satisfy the requirements given by equation (a) mentioned above.

In Tables 4 through 7, the variable range of the wavelength of the semiconductor laser is $\lambda$=780~790 nm.

Please note that tables 5 through 7 are addressed to the case in which the second anamorphic prism functions also as a beam splitter for separating the reflection light.

"$P_1$" and "$P_2$" designate apex angles of the first and second anamorphic prisms, respectively, "$\theta_1$" the incident angle of light upon the incident surface 3a of the first anamorphic prism 3, "$\theta_2$" the angle of refraction at the incident surface 3a of the first anamorphic prism, "$\theta_2$" the incident angle of light upon the outgoing surface 3b of the first anamorphic prism 3, "$\theta_4$" the angle of refraction at the outgoing surface 3b of the first anamorphic prism, "$\theta_5$" the incident angle of light upon the incident surface 4a of the second anamorphic prism 4, and "$\theta_6$" the angle of refraction at the incident surface 4a of the second anamorphic prism. "Error" represents the emission angle error and "TM" represents the total magnification.

TABLE 4

| 1st anamorphic prism | $P_1$ | $\gamma$ | TM | Error |
|---|---|---|---|---|
| glass material SF2 | 30.31 | 1.53 | 2.54 | $1.23 \times 10^{-4}$ |
| glass material SF5 | 29.52 | 1.51 | 2.51 | $2.63 \times 10^{-4}$ |
| glass material F16 | 32.24 | 1.58 | 2.62 | $4.49 \times 10^{-4}$ |

| 2nd anamorphic prism | $P_2$ | $\gamma$ | | |
|---|---|---|---|---|
| glass material BK7 | 35.18 | 1.66 | | | wherein, $P_1 = \theta_2$
$P_2 = \theta_6$

TABLE 5

| 1st anamorphic prism | $P_1$ | $\theta_1$ | $\gamma$ | TM | Error |
|---|---|---|---|---|---|
| glass material SF5 | 27.28 | 58.93 | 1.65 | 2.74 | $1.63 \times 10^{-4}$ | wherein, $P_1 = \theta_2 - \theta_3 = 31.07 - 3.79$

| 2nd anamorphic prism | $P_2$ | $\theta_5$ | $\gamma$ | | |
|---|---|---|---|---|---|
| glass material BK7 | 80.18 | 60.50 | 1.66 | | | wherein, $P_2 = \theta_6 + 45 = 35.18 + 45$

TABLE 6

| 1st anamorphic prism | $P_1$ | $\theta_1$ | $\gamma$ | TM | Error |
|---|---|---|---|---|---|
| glass material SF2 | 30.31 | 55.64 | 1.53 | 2.54 | $1.23 \times 10^{-4}$ |
| glass material SF5 | 29.52 | 54.84 | 1.51 | 2.51 | $2.63 \times 10^{-4}$ |
| glass material F16 | 32.24 | 57.57 | 1.58 | 2.62 | $4.49 \times 10^{-4}$ | wherein, $P_1 = \theta_2$

| 2nd anamorphic prism | $P_2$ | $\theta_5$ | $\gamma$ | | |
|---|---|---|---|---|---|
| glass material BK7 | 80.18 | 60.50 | 1.66 | | | wherein, $P_2 = \theta_6 + 45 = 35.18 + 45$

TABLE 7

| 1st anamorphic prism | $P_1$ | $\theta_1$ | $\gamma$ | TM | Error |
|---|---|---|---|---|---|
| glass material SF5 | 25.04 | 62.50 | 1.80 | 2.99 | $5.56 \times 10^{-4}$ | wherein, $P_1 = \theta_2 - \theta_3 = 32.31 - 7.27$

| 2nd anamorphic prism | $P_2$ | $\theta_5$ | $\gamma$ | | |
|---|---|---|---|---|---|
| glass material BK7 | 80.18 | 60.50 | 1.66 | | | wherein, $P_2 = \theta_6 + 45 = 35.18 + 45$

Figure 6:
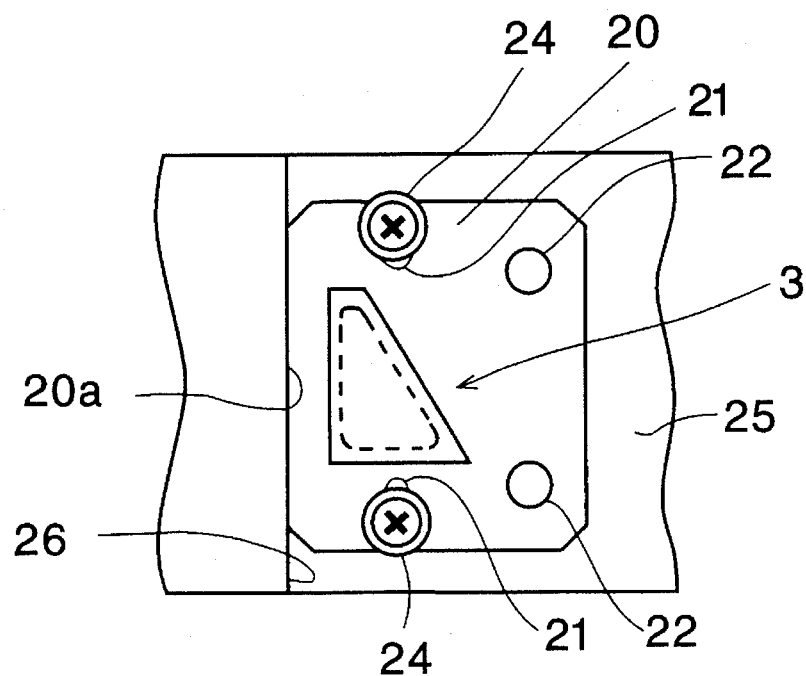
FIGS. 6 and 7 are plan view and side elevation view of a first anamorphic prism according to still another embodiment of the present invention; and, FIG. 8 is a schematic view showing an eccentric displacement of a first anamorphic prism shown in FIGS. 6 and 7.
Figure 7:
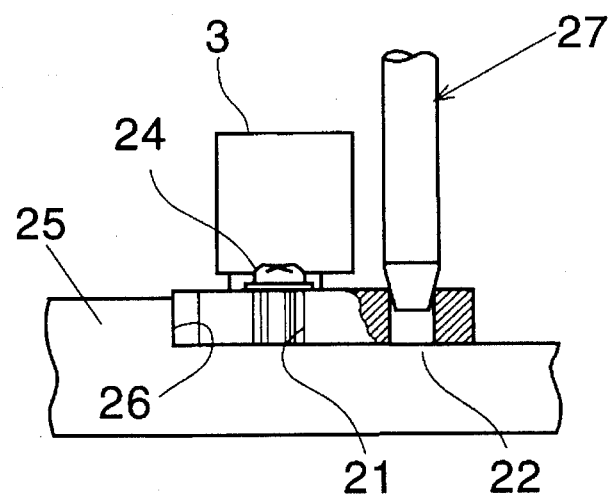
Figure 8:
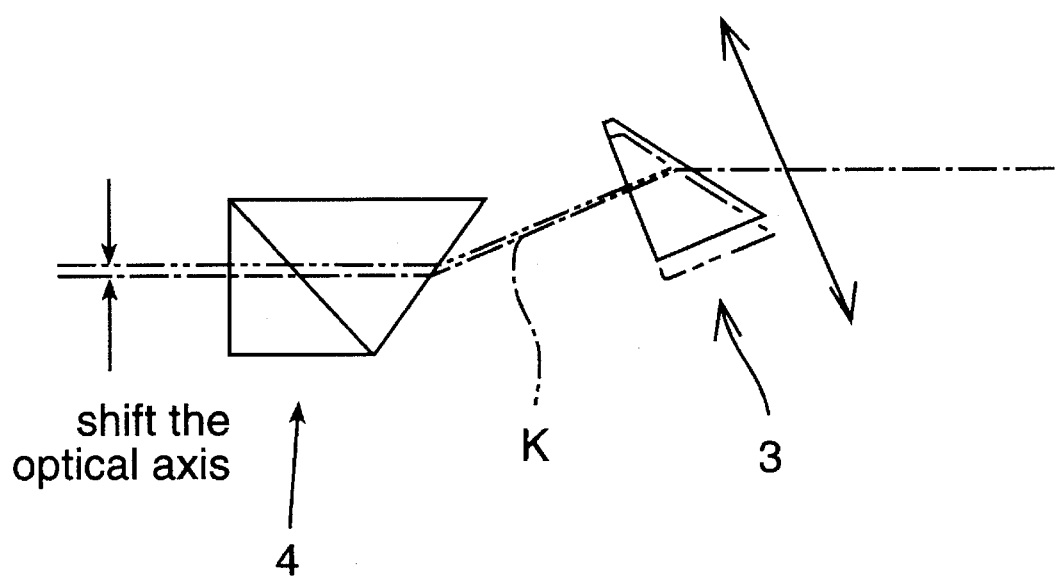

FIGS. 6, 7, and 8 show another embodiment of an attaching and detaching mechanism of the first anamorphic prism 3. In FIGS. 6, 7, and 8 the elements corresponding to those in FIGS. 1, 2, and 4 are designated by the same reference numerals as those in FIGS. 1, 2, and 4.

The first anamorphic prism 3 is secured to the substrate 20 which is provided with a pair of guide grooves 21 and a pair of positioning holes 22. The substrate 20 is secured to the mounting base 25 by a pair of machine screws 24 which are inserted in the corresponding guide grooves 21. The mounting base 25 has an adjusting upright guide surface 26 which comes into contact with the upright wall 20a of the substrate 20. The first anamorphic prism 3 is slidable along the adjusting guide surface 26 in the directions shown by arrows in FIG. 8 to shift the optical axis K of the bundle of rays. Upon shifting the optical axis K, the positioning is effected by a pair of adjusting pins 27 which are inserted in the associated positioning holes 22. Thereafter, the machine screws 24 are fastened in the guide grooves 21 at a predetermined position.

As can be understood from the above, discussion, according to the present invention, the chromatic aberration of the anamorphic prisms can be eliminated to prevent the beam spot, converged onto the optical disc, from being deviated from a predetermined pit of the optical disc, even if the wavelength of the semiconductor laser changes due to a change in the output thereof or a change in ambient temperature, etc.

We claim:

1. An optical system for converging and projecting a bundle of rays emitted from a light source onto an optical disc, comprising:

a collimating lens which collimates the bundle of rays emitted from the light source;

first and second anamorphic prisms which shape a cross section of the collimated bundle of rays transmitted through said collimating lens, a refractive index of said first anamorphic prism being different than a refractive index of said second anamorphic prism an objective lens which conveys the bundle of rays shaped by said first and second anamorphic prisms onto the optical discs; and a substrate to which said first anamorphic prism is secured, and a mounting base which constitutes an immovable body portion of the optical system to which said first anamorphic prism is secured through said substrate, wherein said substrate and said mounting base are provided within an adjusting guide surface and an upright contacting surface which comes into contact with said adjusting guide surface to position said substrate and said mounting base, respectively.

2. An optical system according to claim 1, wherein said first anamorphic prism deviates an optical axis of the collimated bundle of rays.

3. An optical system according to claim 1, wherein at least one of said first and second anamorphic prisms is detachably mounted to an immovable body portion of the optical system.

4. An optical system according to claim 3, wherein at least one of said anamorphic prisms, which is detachably mounted to said immovable body portion of the optical system, is selected from among a plurality of anamorphic prisms having different angular magnifications.

5. An optical system according to claim 1, further comprising a beam splitter which separates a part of the bundle of rays reflected by the optical disc and transmitted through said objective lens, and light receiving means for receiving the bundle of rays split by said beam splitter.

6. An optical system according to claim 5, wherein said second anamorphic prism permits the collimated bundle of rays transmitted through said first anamorphic prism to pass therethrough and reflects light reflected by the optical disc toward said beam splitter.

7. An optical system of according to claim 1, wherein said light source is a semiconductor laser which emits a bundle of rays having an elliptically shaped cross section.

8. An optical system according to claim 7, wherein said first and second anamorphic prisms shape the bundle of rays emitted from said semiconductor laser into a beam having a circular cross section.

9. An optical system according to claim 1, wherein said adjusting guide surface of said substrate is substantially perpendicular to an optical axis of said first and second, anamorphic prisms.

10. An optical system according to claim 9, further comprising a plurality of first anamorphic prisms which can be selectively secured to said substrate at different angles.

11. The optical system according to claim 1, further comprising means for enabling selection of an angular magnification of at least one of said anamorphic prisms in association with a divergence angle of the light source, said enabling means comprising means for detachably mounting at least one of said first and second anamorphic prisms to an immovable body portion of the optical system.

12. An optical system of an optical disc apparatus for converging and projecting a bundle of rays emitted from a light source onto an optical disc, comprising:

a collimating lens which collimates the bundle of rays emitted from the light source;

means for shaping a cross section of the collimated bundle of rays transmitted through said collimating lens, said shaping means comprising first and second anamorphic prisms;

an objective lens which converges the bundle of rays shaped by said shaping means onto the optical disc, said shaping means being detachably mounted to an immovable body portion of the optical system; and a substrate to which said first anamorphic prism is secured, and a mounting base, said mounting base comprising an immovable body portion of the optical system to which said first anamorphic prism is secured through said substrate;

wherein said substrate and said mounting base are provided with an adjusting guide surface and an upright contacting surface which comes into contact with said adjusting guide surface, to position said substrate and said mounting lens; and wherein said adjusting guide surface of said substrate is substantially perpendicular to an optical axis of said first and second anamorphic prisms.

13. An optical system of an optical disc apparatus according to claim 12, further comprising a plurality of first anamorphic prisms which can be selectively secured to said substrate at different angles.

14. The optical system of an optical disc apparatus according to claim 12, wherein a refractive index of said first anamorphic prism is different than a refractive index of said second anamorphic prism.

15. The optical system of an optical disc apparatus according to claim 12, further comprising a beam splitter which separates a part of the bundle of rays reflected by the optical disc and transmitted through said objective lens, and a light receiving surface that receives the bundle of rays split by said beam splitter.

16. The optical system according to claim 15, wherein said second anamorphic prism permits the collimated bundle of rays transmitted through said first anamorphic prism to pass therethrough and reflects light reflected by the optical disc toward said beam splitter, 17. The optical system of an optical disc apparatus according to claim 12, said light source comprising a semiconductive laser which emits a bundle of rays having an elliptically shaped cross-section, said first and second anamorphic prisms shaping the bundle of rays emitted by said semiconductive laser into a beam having a circular cross-section.

18. An optical system for converging and projecting a bundle of rays emitted from a light source onto an optical disc, comprising:

a collimating lens which collimates the bundle of rays emitted from the light source;

first and second anamorphic prisms which shape a cross-section of the collimated bundle of rays transmitted through said collimating lens, a refractive index of said first anamorphic prism being different than a refractive index of said second anamorphic prism; and an objective lens which conveys the bundle of rays shaped by said first and second anamorphic prisms onto the optical disc, wherein refractive indexes $n_1$ and $n_2$ of said first and second anamorphic prisms, an apex angle $P_1$ of said first anamorphic prism, an angle $\theta_6$ of refraction of said second anamorphic prism at an incident surface thereof satisfy the following relationship:

$$0.8 \leq (n_1-1) \cdot P_1/(n_2-1) \cdot \theta_6 \leq 1.25.$$

19. The optical system of claim 18, further comprising a beam splitter which separates a part of the bundle of rays reflected by the optical disc and transmitted through said objective lens and a light receiver that receives the bundle of rays split by said beam splitter.

20. An optical system for converging and projecting a bundle of rays emitted from a light source onto an optical disc, comprising:

a collimating lens which collimates the bundle of rays emitted from the light source;

first and second anamorphic prisms which shape a cross-section of the collimated bundle of rays transmitted through said collimating lens, a refractive index of said first anamorphic prism being different than a refractive index of said second anamorphic prism; and an objective lens which conveys the bundle of rays shaped by said first and second anamorphic prisms onto the optical disc, wherein refractive indexes $n_1$ and $n_2$ of said first and second anamorphic prisms, an apex angle $P_1$ of said first anamorphic prism, an angle $\theta_6$ of refraction said second anamorphic prism at an incident surface thereof, variations $\Delta n_1$ and $\Delta n_2$ of said refractive indexes of said first and second anamorphic prisms corresponding to a change in wavelength, and an angular magnification $\gamma$ of said second anamorphic prism satisfy the following relationship:

$$0.8 \leq (\gamma n_1 \cdot P_1/n_1)/(\Delta n_2 \cdot \theta_6 \cdot \gamma/n_2) \leq 1.25.$$

21. The optical system according to claim 20, further comprising a beam splitter which separates a part of the bundle of rays reflected by the optical disc and transmitted through said objective lens, and a light receiver that receives the bundle of rays split by said beam splitter.

* * * * *

UNITED STATES PATENT AND TRADEMARK OFFICE
CERTIFICATE OF CORRECTION

PATENT NO. : 5,477,386
DATED : December 19, 1995
INVENTOR(S) : I. Okuda et al.

It is certified that error appears in the above-indentified patent and that said Letters Patent is hereby corrected as shown below:

At column 10, line 55 (claim 16, line 5), change "splitter," to ---splitter.---.

Signed and Sealed this

Seventeenth Day of September, 1996

Attest:

BRUCE LEHMAN

*Attesting Officer*     *Commissioner of Patents and Trademarks*